US005451485A

United States Patent [19]

Kaszczuk et al.

[11] Patent Number: 5,451,485

[45] Date of Patent: Sep. 19, 1995

[54] INTERLAYER ADDENDUM FOR LASER ABLATIVE IMAGING

[75] Inventors: Linda Kaszczuk; Lee W. Tutt, both of Webster; Richard W. Topel, Jr., Rochester; Steven Evans, Rochester, all of N.Y.

[73] Assignee: Eastman Kodak Company, Rochester, N.Y.

[21] Appl. No.: 205,537

[22] Filed: Mar. 4, 1994

[51] Int. Cl.[6] .......................... G03C 8/02; B41M 3/12; B32B 27/32; B32B 9/04

[52] U.S. Cl. .................................... 430/201; 430/200; 430/271; 430/292; 430/945; 430/964; 428/478.2; 428/523; 428/914

[58] Field of Search ............... 430/201, 269, 270, 271, 430/279, 292, 945, 964, 200; 428/914, 478.2, 515, 523

[56] References Cited

U.S. PATENT DOCUMENTS

| | | | |
|---|---|---|---|
| 3,787,210 | 1/1974 | Roberts | 96/27 E |
| 3,962,513 | 6/1976 | Eames | 428/323 |
| 4,245,003 | 1/1981 | Oransky et al. | 428/323 |
| 4,451,561 | 5/1984 | Hirabayashi et al. | 430/619 |
| 4,973,572 | 11/1990 | DeBoer | 503/227 |
| 5,156,938 | 10/1992 | Foley et al. | 430/200 |
| 5,171,650 | 12/1992 | Ellis et al. | 430/20 |
| 5,256,506 | 10/1993 | Ellis et al. | 430/20 |
| 5,278,023 | 1/1994 | Bills et al. | 430/201 |

*Primary Examiner*—Paul J. Thibodeau
*Assistant Examiner*—Vivian Chen
*Attorney, Agent, or Firm*—Harold E. Cole

[57] ABSTRACT

A dye-ablative recording element comprising a support having thereon an interlayer containing an inorganic hydrate salt, the interlayer being overcoated with a dye layer comprising an image dye dispersed in a polymeric binder, and the dye layer having an infrared-absorbing material associated therewith.

14 Claims, No Drawings

INTERLAYER ADDENDUM FOR LASER ABLATIVE IMAGING

This invention relates to the use of an interlayer addendum in a laser dye-ablative recording element.

In recent years, thermal transfer systems have been developed to obtain prints from images which have been generated electronically in digital form, such as from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In one ablative mode of imaging by the action of a laser beam, an element with a dye layer composition comprising an image dye, an infrared-absorbing material, and a binder coated onto a substrate is imaged from the dye side. The energy provided by the laser drives off the image dye at the spot where the laser beam hits the element and leaves the binder behind. In ablative imaging, the laser radiation causes rapid local changes in the imaging layer thereby causing the material to be ejected from the layer. This is distinguishable from other material transfer techniques in that some sort of chemical change (e.g., bond-breaking), rather than a completely physical change (e.g., melting, evaporation or sublimation), causes an almost complete transfer of the image dye rather than a partial transfer. The transmission D-min density value serves as a measure of the completeness of image dye removal by the laser.

A problem with these ablative recording media is that Moire patterns are produced when the laser beam is rastered across such imaging media. The pattern is caused by deformation in a regular fashion of the element so that a diffraction grating is produced in large written areas. It is desirable to find some means by which formation of such a grating can be eliminated or reduced.

U.S. Pat. No. 4,245,003 discloses using a non-self-oxidizing binder with graphite pigment in a transfer process creating both a positive proof and the remainder sheet a negative master. U.S. Pat. No. 5,156,938 discloses a similar system except that it utilizes self-oxidizing binders and optionally hydrogen atom donors. However, there is no disclosure in these patents of incorporating certain materials to reduce diffraction grating or Moire patterns.

U.S. Pat. No. 4,973,572 relates to infrared-absorbing cyanine dyes used in laser-induced thermal dye transfer elements. In Example 3 of that patent, a positive image is obtained in the dye element by using an air stream to remove sublimed dye. However, there is no disclosure in that patent of using an interlayer for Moire pattern reduction.

U.S. Pat. No. 5,171,650 relates to an ablation-transfer image recording process. In that process, an element is employed which contains a dynamic release layer which absorbs imaging radiation which in turn is overcoated with an ablative carrier topcoat. An image is transferred to a receiver in contiguous registration therewith. The useful image obtained in this process is contained on the receiver element. However, there is no disclosure in that patent that a useful positive image can be obtained in the recording element, or of a single-sheet process, or that certain materials in an interlayer are useful in reducing Moire patterns.

It is an object of this invention to provide a process for improving the D-min obtained in a dye-ablative recording element. It is another object of this invention to provide a single-sheet process which does not require a separate receiving element. It is another object of this invention to provide a monocolor laser ablative recording element producing images with reduced Moire patterns.

These and other objects are achieved in accordance with the invention which relates to a dye-ablative recording element comprising a support having thereon an interlayer containing an inorganic hydrate salt, the interlayer being overcoated with a dye layer comprising an image dye dispersed in a polymeric binder, and the dye layer having an infrared-absorbing material associated therewith.

Another embodiment of the invention relates to a process of forming a single color, dye ablation image comprising imagewise heating by means of a laser, the dye-ablative recording element described above, the laser exposure taking place through the dye side of the element, and removing the ablated image dye material to obtain an image in the dye-ablative recording element.

Examples of inorganic hydrates which are useful in the invention include:

Compound 1: Ferric Nitrate, 9-Hydrate $Fe(NO_3)_3 \cdot 9H_2O$

Compound 2: Ferric Chloride, 6-Hydrate $FeCl_3 \cdot 6H_2O$

Compound 3: Magnesium Nitrate, 6-Hydrate $Mg(NO_3)_2 \cdot 6H_2O$

Compound 4: Magnesium Sulfate, 7-Hydrate $MgSO_4 \cdot 7H_2O$

Compound 5: Lanthanum Nitrate, 6-Hydrate $La(NO_3)_3 \cdot 6H_2O$

Compound 6: Aluminum Potassium Sulfate, 12-Hydrate, $AlK(SO_4)_2 \cdot 12H_2O$

Compound 7: Sodium Succinate, 2-Hydrate $Na_2(OCOCH_2CH_2COO) \cdot 2H_2O$

Compound 8: Sodium Metasilicate, 9-Hydrate $Na_2SiO_3 \cdot 9H_2O$

Compound 9: Sodium Tungstate, 2-Hydrate $Na_2WO_4 \cdot 2H_2O$

Compound 10: Sodium Thiosulfate, 5-Hydrate $Na_2S_2O_3 \cdot 5H_2O$

Compound 11 Sodium Borate, 10-Hydrate $Na_2B_4O_7 \cdot 10H_2O$

Compound 12 Sodium Phosphate, Tribasic, 12-Hydrate, $Na_3PO_4 \cdot 12H_2O$

In a preferred embodiment of the invention, the hydrate salt is $MgSO_4 \cdot 7H_2O$, $Na_2(OCOH_2CH_2COO) \cdot 2H_2O$, $Na_2SiO_3 \cdot 9H_2O$, $Na_2S_2O_3 \cdot 5H_2O$ or $Na_2B_4O_7 \cdot 10H_2O$. In another preferred embodiment, the number of water molecules in said salt is greater than 5.

The interlayer in the dye-ablative recording element can contain a hydrophilic material such as, for example, gelatin, poly(vinyl alcohol), hydroxyethyl cellulose, polyvinylpyrrolidone, casein, albumin, guargum, and the like, or a material as disclosed in U.S. Ser. No. 08/099,970 filed Jul. 30, 1993, abandoned, of Topel, Jr. and Kaszczuk entitled "Barrier Layer For Laser Ablative Imaging". In a preferred embodiment of the invention, the hydrophilic binder is poly(vinyl alcohol) or nitrocellulose. Good results have been obtained when the interlayer is present at a concentration of from about 0.01 to about 1.0 $g/m^2$.

During the laser writing process (imagewise rastering of the laser beam across the recording element), the inorganic hydrate in the interlayer loses its water of hydration due to the heat produced. As the water of hydration is lost, it bursts through the surface of the element, causing random pitting which breaks up the regular line deformation caused by the raster writing process. This results in decreased observed diffraction or Moire patterns. This is important, for example, in medical imaging applications where the Moire pattern detracts from the diagnostic interpretation of the image.

The dye removal process in the invention can be either continuous (photographic-like) or halftone. For purposes of this invention, monocolor refers to any single dye or dye mixture used to produce a single stimulus color. The resulting single-sheet medium can be used for creating medical images, reprographic masks, printing masks, etc., or it can be used in any application where a monocolored transmission sheet is desired. The image obtained can be a positive or a negative image.

Any polymeric material may be used as the binder for the dye layer in the recording element employed in the process of the invention. For example, there may be used cellulosic derivatives, e.g., cellulose nitrate, cellulose acetate hydrogen phthalate, cellulose acetate, cellulose acetate propionate, cellulose acetate butyrate, cellulose triacetate, a hydroxypropyl cellulose ether, an ethyl cellulose ether, etc., polycarbonates; polyurethanes; polyesters; poly(vinyl acetate); polystyrene; poly(styrene-co-acrylonitrile); a polysulfone; a poly(phenylene oxide); a poly(ethylene oxide); a poly(vinyl alcohol-co-acetal) such as poly(vinyl acetal), poly(vinyl alcohol-co-butyral) or poly(vinyl benzal); or mixtures or copolymers thereof. The binder may be used at a coverage of from about 0.1 to about 5 $g/m^2$.

In a preferred embodiment, the polymeric binder used in the recording element employed in the process of the invention has a polystyrene equivalent molecular weight of at least 100,000 as measured by size exclusion chromatography, as described in U.S. Pat. No. 5,530,876 by Kaszczuk and Topel and entitled, "HIGH MOLECULAR WEIGHT BINDERS FOR LASER ABLATIVE IMAGING".

To obtain a laser-induced, dye-ablative image using the process of the invention, a diode laser is preferably employed since it offers substantial advantages in terms of its small size, low cost, stability, reliability, ruggedness, and ease of modulation. In practice, before any laser can be used to heat a dye-ablative recording element, the element must contain an infrared-absorbing material, such as cyanine infrared-absorbing dyes as described in U.S. Pat. No. 4,973,572, or other materials as described in the following U.S. Pat. Nos.: 4,948,777, 4,950,640, 4,950,639, 4,948,776, 4,948,778, 4,942,141, 4,952,552, 5,036,040, and 4,912,083, the disclosures of which are hereby incorporated by reference. As noted above, an infrared-absorbing material is contained in either the image dye layer, or a layer associated therewith, such as an interlayer, or both. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. As noted above, the laser exposure in the process of the invention takes place through the dye side of the dye ablative recording element, which enables this process to be a single-sheet process, i.e., a separate receiving element is not required.

Lasers which can be used in the invention are available commercially. There can be employed, for example, Laser Model SDL-2420-H2 from Spectra Diode Labs, or Laser Model SLD 304 V/W from Sony Corp.

Any image dye can be used in the dye-ablative recording element employed in the invention provided it can be ablated by the action of the laser. Especially good results have been obtained with dyes such as anthraquinone dyes, e.g., Sumikaron Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumikaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumiacryl Blue 6G® (product of Sumitomo Chemical Co., Ltd.), and Aizen Malachite Green® (product of Hodogaya Chemical Co., Ltd.);

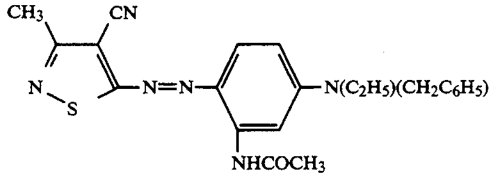
Magenta 1

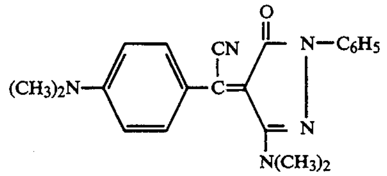
Magenta 2

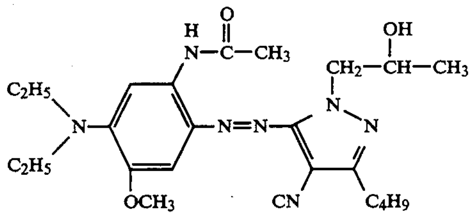
Magenta 3

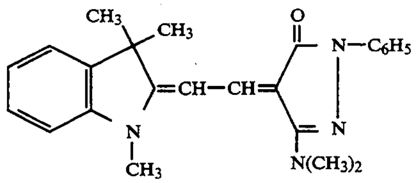
Yellow 1

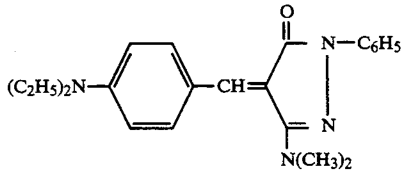
Yellow 2

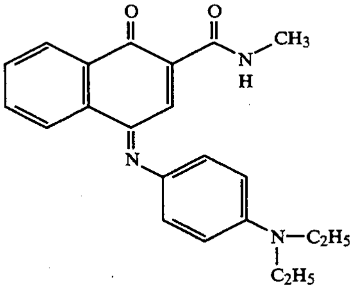
Cyan 1

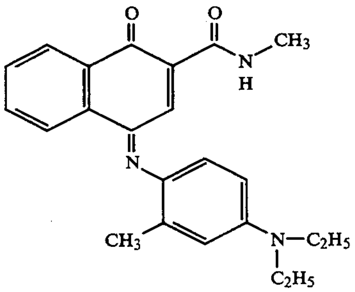
Cyan 2

-continued

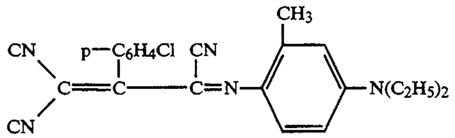
Cyan 3 or any of the dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference. The above dyes may be employed singly or in combination. The dyes may be used at a coverage of from about 0.05 to about 1 $g/m^2$ and are preferably hydrophobic.

The dye layer of the dye-ablative recording element employed in the invention may be coated on the support or printed thereon by a printing technique such as a gravure process.

Any material can be used as the support for the dye-ablative recording element employed in the invention provided it is dimensionally stable and can withstand the heat of the laser. Such materials include polyesters such as poly(ethylene naphthalate); poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 $\mu m$. In a preferred embodiment, the support is transparent.

The following examples are provided to illustrate the invention.

EXAMPLE 1

Monocolor media sheets were prepared by coating 100 $\mu m$ poly(ethylene terephthalate) support with the following hydrate compounds: compound 4, compound 7, compound 8, compound 10, and compound 11, identified above, at 0.11 $g/m^2$ in 0.38 $g/m^2$ of poly(vinyl alcohol). For demonstration purposes, each of the above layers was overcoated with a black dye layer containing 0.52 $g/m^2$ of cellulose nitrate (Aqualon Co), 0.18 $g/m^2$ of infrared dye IR-2, illustrated below, 0.30 $g/m^2$ of cyan dye 2, 0.15 $g/m^2$ of cyan dye 3, 0.16 $g/m^2$ of yellow dye 2 and 0.26 $g/m^2$ of magenta dye 3, all illustrated above.

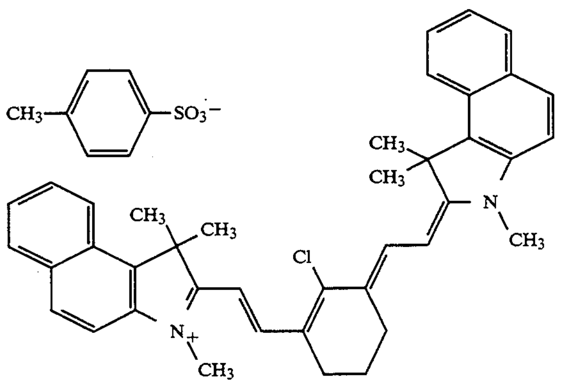
IR-1 (infrared-absorbing dye)

-continued

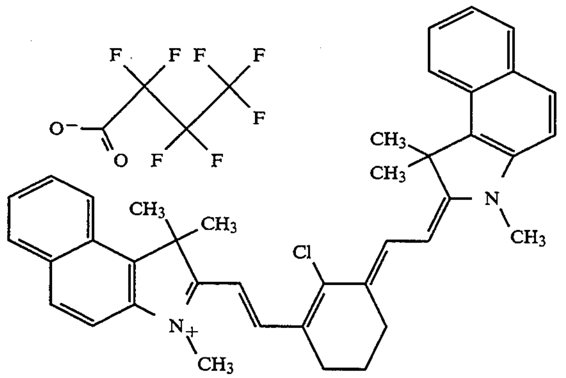

IR-2 (infrared-absorbing dye)

The samples were ablation-written using Spectra Diode Labs Lasers Model SDL-2432, having an integral, attached fiber for the output of the laser beam with a wavelength range of 800–830 nm and a nominal power output of 250 milliwatts at the end of the optical fiber. The cleaved face of the optical fiber (50 μm core diameter) was imaged onto the plane of the dye-ablative element with a 0.5 magnification lens assembly mounted on a translation stage giving a nominal spot size of 25 μm.

The drum, 53 cm in circumference, was rotated at varying speeds and the imaging electronics were activated to provide the exposures cited in Table 1. The translation stage was incrementally advanced across the dye-ablation element by means of a lead screw turned by a microstepping motor, to give a center-to-center line distance of 10 μm (945 lines per centimeter, or 2400 lines per inch). An air stream was blown over the donor surface to remove the sublimed dye. The measured total power at the focal plane was 100 mW.

Measurements of the amount of diffraction grating resulting from the ablative imaging process were taken by directing a Uniphase helium-neon laser Model 1508-0 onto the film at a distance of 58 cm from the laser. Diffraction of the beam due to the grating was measured at the first order beam. Both the zero order and first order beams were measured at a distance of 140 cm from the sample. Each beam was passed through an iris (Newport Model ID-1.0) before collection by a photodetector (Newport Model 818-SL) fitted with two 3.0 OD neutral density filters (Newport Model 883-SL). The voltage of the detector was measured using a Keithley 179A TRMS Multimeter. The results reported are the ratio of the intensity of the first order beam divided by the sum of the first and zero order beams multiplied by 1000. This is a direct measure of the relative intensity being diffracted and hence the efficiency of the diffraction grating. A smaller number is desirable for minimizing diffraction.

The media sheets were ablation-written at 150 rev/min at 755 mJ/cm$^2$ with the following results:

TABLE 1

| Example # | # of $H_2O$ Molecules in Hydrate | Hydrate Cmpd | Diffraction Intensity |
|---|---|---|---|
| Control | — | None | 231 |
| 1-A | 7 | Cmpd 4 | 22 |
| 1-B | 2 | Cmpd 7 | 106 |
| 1-C | 9 | Cmpd 8 | 43 |
| 1-D | 5 | Cmpd 10 | 170 |
| 1-E | 10 | Cmpd 11 | 93 |

The above results show examples which contain the hydrate compounds in the interlayer have reduced the diffraction efficiency in all cases as compared to the control which does not contain any hydrate compound. The hydrate compounds with the higher number of water molecules have the greatest efficiency.

EXAMPLE 2

This example demonstrates that the improvement caused by the hydrate compound is independent of the binder composition. Samples similar to those in Example 1 were prepared except that 0.38 g/m$^2$ of gelatin was used as the binder in the interlayer. The following results were obtained:

TABLE 2

| Example # | # of $H_2O$ Molecules in Hydrate | Hydrate Cmpd | Diffraction Intensity |
|---|---|---|---|
| Control | — | None | 38 |
| 2-A | 2 | Cmpd 7 | 30 |
| 2-B | 9 | Cmpd 8 | 0 |
| 2-C | 5 | Cmpd 10 | 34 |
| 2-D | 10 | Cmpd 11 | 0 |

The above results again show that the examples which contain the hydrate compounds in the interlayer have reduced the diffraction efficiency in all cases as compared to the control which does not contain any hydrate compound.

EXAMPLE 3

This example shows the effect of the addition of an infrared-absorbing dye to the interlayer. The samples were similar to those of Example 2 except that 0.054 g/m$^2$ of infrared dye IR-1 (illustrated above) was added to the interlayer and the media sheets were ablation-written at both 150 and 200 rev/min at 755 mJ/cm$^2$ and 566 mJ/cm$^2$. The following results were obtained:

TABLE 3

| Example # | # of $H_2O$ Molecules in Hydrate | Hydrate Cmpd | Diffraction Intensity @ 755 mJ/cm$^2$ | Diffraction Intensity @ 566 mJ/cm$^2$ |
|---|---|---|---|---|
| Control | — | None | 179 | 120 |
| 3-A | 2 | Cmpd 7 | 0 | 0 |
| 3-B | 9 | Cmpd 8 | 163 | 105 |
| 3-C | 5 | Cmpd 10 | 0 | 0 |
| 3-D | 10 | Cmpd 11 | 111 | 0 |

Improvement is observed in all cases where the hydrate salts were added, an infrared-absorbing dye also being present in the interlayer.

EXAMPLE 4

This example is similar to Example 1-C except that the level of hydrate salt was varied as shown in Table 4. The samples were exposed at 200 rev/min or 566 mJ/cm$^2$ with the following results:

TABLE 4

| Example # | Compound 8 ($g/m^2$) | Diffraction Intensity |
|---|---|---|
| Control | None | 73 |
| 4-A | 0.027 | 15 |
| 4-B | 0.054 | 0 |

The above results show that, even at the lowest experimental level tested, the hydrate salt was found to be effective.

The invention has been described in detail with particular reference to preferred embodiments thereof, but it will be understood that variations and modifications can be effected within the spirit and scope of the invention.

What is claimed is:

1. A dye-ablative recording element comprising a support having thereon an interlayer containing an inorganic hydrate salt, said interlayer being overcoated with a dye layer comprising an image dye dispersed in a polymeric binder, and said dye layer having an infrared-absorbing material associated therewith.

2. The element of claim 1 wherein said hydrate salt is $MgSO_4 \cdot 7H_2O$, $Na_2(OCOCH_2CH_2COO) \cdot 2H_2O$, $Na_2SiO_3 \cdot 9H_2O$, $Na_2S_2O_3 \cdot 5H_2O$ or $Na_2B_4O_7 \cdot 10H_2O$.

3. The element of claim 1 wherein the number of water molecules in said salt is greater than 5.

4. The element of claim 1 wherein said interlayer also contains a hydrophilic binder.

5. The element of claim 4 wherein said hydrophilic binder comprises poly(vinyl alcohol).

6. The element of claim 4 wherein said hydrophilic binder comprises gelatin.

7. The element of claim 1 wherein said support is transparent.

8. A process of forming a single color, dye ablation image comprising imagewise-heating by means of a laser in the absence of a separate receiving element, a dye-ablative recording element comprising a support having thereon an interlayer containing an inorganic hydrate salt, said interlayer being overcoated with a dye layer comprising an image dye dispersed in a polymeric binder, and said dye layer having an infrared-absorbing material associated therewith, said laser exposure taking place through the dye side of said element, and removing the ablated image dye material to obtain said image in said dye-ablative recording element.

9. The process of claim 8 wherein said hydrate salt is $MgSO_4 \cdot 7H_2O$, $Na_2(OCOCH_2CH_2COO) \cdot 2H_2O$, $Na_2SiO_3 \cdot 9H_2O$, $Na_2S_2O_3 \cdot 5H_2O$ or $Na_2B_4O_7 \cdot 10H_2O$.

10. The process of claim 8 wherein the number of water molecules in said salt is greater than 5.

11. The process of claim 8 wherein said interlayer also contains a hydrophilic binder.

12. The process of claim 11 wherein said hydrophilic binder comprises poly(vinyl alcohol).

13. The process of claim 11 wherein said hydrophilic binder comprises gelatin.

14. The process of claim 8 wherein said support is transparent.

* * * * *